United States Patent
Permetti

(10) Patent No.: US 6,837,065 B2
(45) Date of Patent: Jan. 4, 2005

(54) MIST COOLER

(76) Inventor: Stephen Permetti, 1642 Helix St., Spring Valley, CA (US) 91977

( * ) Notice: Subject to any disclaimer, the term of this patent is extended or adjusted under 35 U.S.C. 154(b) by 0 days.

(21) Appl. No.: 10/423,167

(22) Filed: Apr. 25, 2003

(65) Prior Publication Data

US 2004/0211208 A1 Oct. 28, 2004

(51) Int. Cl.$^7$ ................................................ F28D 5/00
(52) U.S. Cl. ................................ 62/305; 62/95; 62/191
(58) Field of Search .......................... 62/305, 171, 183, 62/506, 95

(56) References Cited

U.S. PATENT DOCUMENTS

| | | | | |
|---|---|---|---|---|
| 3,872,684 A | * | 3/1975 | Scott ............................ | 62/181 |
| 4,193,269 A | * | 3/1980 | Barry ........................... | 62/171 |
| 4,266,406 A | | 5/1981 | Ellis | |
| 4,274,266 A | * | 6/1981 | Shires .......................... | 62/171 |
| 4,542,627 A | * | 9/1985 | Welker ......................... | 62/171 |
| 4,685,308 A | * | 8/1987 | Welker et al. ................. | 62/171 |
| 4,752,419 A | | 6/1988 | Sperr, Jr. et al. | |
| 4,939,907 A | * | 7/1990 | Taylor ............................ | 62/95 |
| 5,003,789 A | * | 4/1991 | Gaona et al. .................. | 62/304 |
| 5,074,124 A | * | 12/1991 | Chapman ..................... | 62/305 |
| 5,285,651 A | * | 2/1994 | Marine ........................ | 62/171 |
| 5,311,747 A | * | 5/1994 | Pringle et al. ................ | 62/183 |
| 5,605,052 A | * | 2/1997 | Middleton et al. ............ | 62/171 |
| 6,253,565 B1 | * | 7/2001 | Arledge ........................ | 62/305 |
| 2002/0056279 A1 | | 5/2002 | Hara | |
| 2002/0078985 A1 | | 6/2002 | Farr | |
| 2002/0085892 A1 | | 7/2002 | Hara | |

* cited by examiner

*Primary Examiner*—Melvin Jones
(74) *Attorney, Agent, or Firm*—David R Preston & Associates APC; Mo Savari

(57) ABSTRACT

The present invention relates to a mist cooler and in particular to a means for cooling the air partially or wholly surrounding a conventional air cooled condenser of an air cooler or a refrigeration unit. The present invention is particularly adaptable as an addition, which works in conjunction with an existing air cooler by lowering the temperature of the air before the air enters the air intake of the air cooler or refrigeration unit. The present invention can be combined as an addition to any air conditioning air cooled condenser for residential, commercial, industrial, or institutional application.

32 Claims, 2 Drawing Sheets

MIST COOLER

FIELD OF INVENTION

The present invention relates generally to the field of air coolers, and particularly to a mist air cooler, a mist pre-cooler, and a method to cool surrounding air using mist.

BACKGROUND OF THE INVENTION

A variety of air cooled air conditioners, air cooled refrigeration units, and air coolers are commercially available. These air coolers can be used for a variety of purposes, such as cooling the inside of homes, commercial spaces industrial buildings on hot days and lowering the temperature of an area to keep perishables such as foodstuff, plants, and flowers fresh for long durations.

Many of the available air conditioners and coolers are inefficient and use more energy than required to lower the temperature of the air. The high level of energy consumption by these inefficient air coolers corresponds to higher operating costs. While there has been a trend to produce more efficient and more economical air cooling systems, further improvements in the effectiveness and efficiency of air cooling systems are desirable, and the present invention addresses the existing problems and provides related benefits.

SUMMARY OF THE INVENTION

The present invention relates to a mist cooler and in particular to a means for cooling the air partially or wholly a conventional air cooled condenser of an air cooler or refrigeration unit. The present invention is particularly adaptable as an addition, which works in conjunction with an existing air cooler by lowering the temperature of the air before the air enters the air intake of the air cooler or refrigeration unit. The present invention can be combined as an addition to any air cooled air conditioning air cooled condenser for residential, commercial, industrial, or institutional application.

The present invention recognizes that air cooled condensers can be made more efficient using a mist cooler, which cools the air partially or wholly surrounding the air cooled condenser, preferably the mist cooler creates a cool mist by providing a mist directed away from the air cooled condenser into the air in close proximity to the air cooled condenser.

A first aspect of the present invention is a device for lowering the temperature in close proximity to the air cooled condenser of an air cooling system including a mister manifold, which is mounted in close proximity to the air cooled condenser and is connected to a fluid source. The mister manifold includes at least one mister positioned generally outwardly and away from the air cooled condenser, such that when the fluid enters the mister manifold and exits from the mister, a cool mist is created that partially or wholly surrounds the air cooled condenser, which operates to cool the air cooled condenser.

A second aspect of the present invention is a pre-cooler for air flowing through an associated air cooler including a mister manifold that is connected to a fluid source. The mister manifold includes a front side with at least one mister angled generally outwardly and generally away from the mister manifold, and a rear side, which is mounted in close proximity to the air intake of the associated air cooler, such that when the fluid source enters the mister manifold and exits form the mister, a cool mist is created in close proximity to the air intake of the associated air cooler, which operates to cool the air before it enters the associated air cooler making the air cooler more efficient.

A third aspect of the present invention is a device for lowering the temperature of air partially or wholly surrounding the air cooled condenser of an air cooler including means for receiving a fluid and introducing it to a mister, which is angled generally outwardly and generally away from the air cooled condenser, wherein the receiving means is mounted in close proximity to the air cooled condenser, such that the mister creates a cool mist in close proximity to the air cooled condenser that cools the air partially or wholly surrounding the air cooled condenser, which operates to cool the air cooled condenser.

A fourth aspect of the present invention is a method of cooling the air partially or wholly surrounding the air cooled condenser of an air cooler including the steps of: providing at least one mister in close proximity to the air cooled condenser with the nozzle of the air cooled condenser positioned generally outwardly and generally away from the air cooled condenser, wherein said mister is adapted to be connected to fluid source, such that the mister creates a cool mist in close proximity to the air cooled condenser, which operates to cool the air cooled condenser.

DETAILED DESCRIPTION OF THE INVENTION

Introduction

Figure 1A:
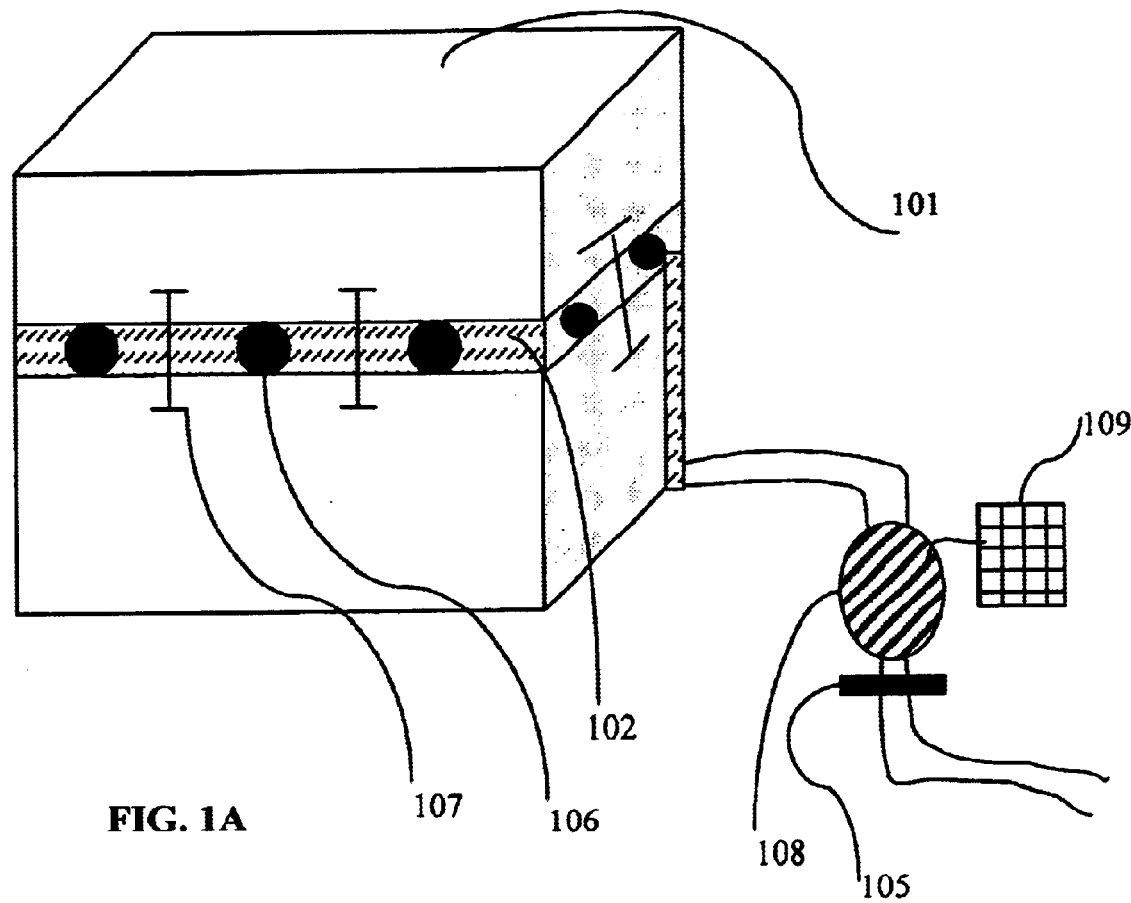
FIG. 1A shows a perspective view of a conventional air cooled condenser such as a commercially available air cooled condenser unit such as external or window mounted having a cool mister mounted thereon.

The present invention recognizes that air cooled condensers can be cooled and hence be made more efficient using a mist cooler, which cools the air in close proximity to the air cooled condenser. Preferably the mist cooler provides a cool mist by directing the mist away from the air cooled condenser into the air in close proximity to the air cooled condenser.

As a non-limiting introduction to the breadth of the present invention, the present invention includes several general and useful aspects, including:

1) a device for lowering the temperature of the air in close proximity to the air cooled condenser of an air cooler including a mister manifold, which is mounted in close proximity to the air cooled condenser and is connected to a fluid source. The mister manifold includes at least one mister positioned generally outwardly and generally away from the air cooled condenser, such that when the fluid enters the mister manifold and exits from the mister, a cool mist is created in close proximity to the air cooled condenser, which operates to cool the air cooled condenser.

2) a pre-cooler for air flowing through an associated air cooler including a mister manifold that is connected to a fluid source. The mister manifold includes a front side with at least one mister angled generally outwardly and generally away from the mister manifold, and a rear side, which is mounted in close proximity to the air intake of the associated air cooler, such that when the fluid source enters the mister manifold and exits form the mister, a cool mist is created in close proximity to the air intake of the associated air cooler, making the air cooler more efficient.

3) a device for lowering the temperature of air that partially or wholly surrounds the air cooled condenser of an air cooler including means for receiving a fluid and introducing it to a mister, which is angled generally outwardly and generally away from the air cooled condenser, wherein the receiving means is mounted in close proximity to the air cooled condenser, such that when the fluid exits the mister, a cool mist is created in close proximity to the air cooled condenser, which operates to cool the air cooled condenser.

4) a method of cooling the air the air cooled condenser of an air cooler including the steps of: providing at least one mister in close proximity to the air cooled condenser with the nozzle of the air cooled condenser positioned generally outwardly and generally away from the air cooled condenser, wherein said mister is adapted to be connected to fluid source, such that the mister creates a cool mist in close proximity to the air cooled condenser, which operates to cool the air cooled condenser The present invention relates to a mist cooler that is efficient and economical to use in conjunction with a conventional air coolers. The present invention provides a mist cooler adapted for cooling the air partially or wholly surrounding a conventional air cooled condenser of an air cooler. The present invention enhances the ability of the mist to lower the temperature of the air partially or wholly surrounding the air cooled condenser by directing the mist away from the air cooled condenser as opposed to cooling the air cooled condenser by spraying a fluid directly onto the air cooled condenser. The mist lowers the temperature of the air partially or wholly surrounding the air cooled condenser and thus lowers the temperature of the air cooled condenser.

Further objectives and advantages of the present invention will become apparent as the description proceeds and when taken in conjunction with the accompanying drawings. To gain a full appreciation of the scope of the present invention, it will be further recognized that various aspects of the present invention can be combined to make desirable embodiments of the invention.

Unless defined otherwise, all technical and scientific terms used herein have the same meaning as commonly understood by one of ordinary skill in the art to which this invention belongs. Where a term is provided in the singular, the inventor also contemplates the plural of that term. The nomenclature used herein and the procedures described below are those well known and commonly employed in the art.

I. Device for Lowering the Temperature of Air Partially or Wholly Surrounding the Air Cooled Condenser of An Air Cooler The present invention includes an efficient mist cooler that is adapted to lower the temperature of the air partially or wholly surrounding the air cooled condenser of an air cooler by way of directing a fine mist of cooling fluid through at least one mister generally away from the air cooled condenser. A mist cloud partially or wholly surrounds the air cooled condenser, lowering the temperature of the surrounding air accessible to the air cooled condenser. This system increases the efficiency of the cooling system because the cool air surrounding the air cooled condenser lowers the temperature of the air cooled condenser faster and by a larger degree than the surrounding air that is not cooled by the mist cooler of the present invention. By lowering the air temperature the air partially or wholly surrounding the air cooled condenser the present invention will reduce energy consumption.

The present invention includes one or more mister manifolds. The mister manifold provides one or more misters, which can be nothing more than small apertures on the mister manifold for releasing mist into the air. Alternatively, the mister can be a stand-alone device situated in close proximity to the air cooled condenser. The mister manifold can work in conjunction with any shape and size air cooled condenser. The mister manifold preferably encircles the air cooled condenser depending on the shape of the air cooled condenser. The mister manifold may be in multiple rows mounted on the sides of the air cooled condenser or they may encircle the air cooled condenser one or more times.

The mister manifold is adapted to be connected to a fluid source wherein the fluid enters the mister manifold. The fluid may be any fluid with evaporative properties including water, alcohol, or propylene glycol. Evaporation of such fluids is endothermic. The evaporation of such fluids has the effect of lowering the surrounding air temperature.

The present invention may also include a fluid valve. The fluid valve may preferably have a connector for attachment to a standard lawn hose The fluid valve may be manually powered or be powered by any power source including the transformer in the furnace or air handler of a conventional air cooling system, such that when the thermostat of the conventional air cooler calls for cooling, it energizes one or more wires that are connected to the air cooled condenser, which power the fluid valve of the present invention allowing fluid to flow through the valve and through the mister manifold to the misters. When the thermostat reaches a predetermined temperature, it shuts off the power to the air cooled condenser and thus power to the fluid valve and as a result shuts off the flow of fluid to the misters.

Alternatively, the fluid valve may be regulated by a sensor, which senses the activation of the air cooler, and signals the fluid pump to force fluid through the mister manifold to the misters. Other types of sensors that may be utilized are temperature sensors that sense the temperature of the air cooled condenser, which activate and deactivate the fluid valve when the temperature of the air cooled condenser reaches a predetermined temperature.

Each individual mister may have range of output capacity of creating mist between about 0.1 gallons per hour to about 10 gallons per hour. Preferably each mister has an output capacity of between about 0.75 gallons per hour to about 2.5 gallons per hour, and more preferably between about 0.75 gallons per hour to about 1 gallon per hour, but most preferably each mister will have an output capacity of about 0.75 gallons per hour.

Preferably, the mister or a plurality of misters is configured to cover an area of between about 1 to about 50 square feet, more preferably about 5 to about 20 square feet, but most preferably about 20 square feet in close proximity to the air cooled condenser. Preferably the mister nozzles are attached to the mister manifolds, and the misters are spaced apart. The distance between each mister may be between about 0.5 inches to about 48 inches apart, preferably between about 5 to about 30 inches apart, but most preferably about 20 inches apart. An important objective of the present invention is to provide misters in close proximity to the air cooled condenser wherein the misters are position generally outwardly and generally away from the air cooled condenser, thus cooling the air partially or wholly surrounding the air cooled condenser and increasing the effectiveness and efficiency of the cooling system.

The mister manifold or manifolds may be made of any material capable of forming a tube including metallic and non-metallic materials. Preferably the mister manifold will be made of plastic tubing of any size, preferably between about 1/64 inch to about 5 inch flexible plastic tubing, and most preferably about 5/16 inch flexible plastic tubing, with a plurality of misters attached thereto.

II. Pre-Cooler for Air Flowing Through an Associated Air Cooler

The present invention includes a mist cooler that functions as a pre-cooler for a conventional evaporative cooler by providing misters that are in close proximity to the air intake, and positioned outwardly and generally away from the air intake of the evaporative cooler. The present invention will cool the air before the air enters the evaporative cooler, thus improving the effectiveness and efficiency of the conventional evaporative cooler.

The present invention includes one or more mister manifolds. The mister manifold provides one or more misters, which can be nothing more than small apertures on the mister manifold for releasing mist into the air. Alternatively, the mister can be a stand-alone device situated in close proximity to the air cooled condenser. The mister manifold can work in conjunction with any shape and size air cooler having an air intake. The mister manifolds are preferably situate substantially in the same plane as the opening of the air intake. The mister manifold may the in multiple rows mounted on the sides of the air intake and traverse the opening of the air intake.

The present invention may also optionally include a housing that is adapted or sized for attachment to the air intake opening of the associated air cooler. The mister manifold may be attached to the side-walls of the housing and traversing the housing.

The present invention may also optionally include a gutter to collect and remove runoff fluid away from the air intake of the associated air cooler. The gutter may be adapted to be attached to the air intake or the mist cooler housing, which collects fluid and removes it from the air intake.

The mister manifold is adapted to be connected to a fluid source wherein the fluid enters the mister manifold. The fluid may be any fluid with evaporative properties including water, alcohol, or propylene glycol. Evaporation of such fluids is endothermic. The evaporation of such fluids has the effect of lowering the surrounding air temperature.

The present invention may also include a fluid valve. The fluid valve may preferably have a connector for attachment to a standard lawn hose The fluid valve may be powered by the transformer in the furnace or air handler of a conventional air cooler, such that when the thermostat of the conventional air cooler calls for cooling, it energizes one or more wires that are connected to the air cooled condenser, which power the fluid valve of the present invention allowing fluid to flow through the valve and through the mister manifold to the misters. When the thermostat reaches a predetermined temperature, it shuts off the power to the air cooled condenser and thus power to the fluid valve and as a result shuts off the flow of fluid to the misters.

Alternatively, the fluid valve may be regulated by a sensor, which senses the activation of the associated air cooler, and signals the fluid pump to force fluid through the mister manifold to the misters. Other types of sensors that may be utilized are temperature sensors that sense the temperature of the air cooled condenser of the associated air cooler, which activate and deactivate the fluid valve when the temperature of the air cooled condenser reaches a predetermined temperature.

Each individual mister may have range of output capacity of creating mist between about 0.1 gallons per hour to about 10 gallons per hour. Preferably each mister has an output capacity of between about 0.75 gallons per hour to about 2.5 gallons per hour, and more preferably between about 0.75 gallons per hour to about 1 gallon per hour, but most preferably each mister will have an output capacity of about 0.75 gallons per hour.

Preferably, the mister or a plurality of misters is configured to cover an area of between about 1 to about 50 square feet, more preferably about 5 to about 20 square feet, but most preferably about 20 square feet in close proximity to the opening of the air intake. Preferably the mister nozzles are attached to the mister manifolds, and the misters are spaced apart. The distance between each mister may be between about 0.5 inches to about 48 inches apart, preferably between about 5 to about 30 inches apart, but most preferably about 20 inches apart. An important objective of the present invention is to provide misters in close proximity to the opening of the air intake wherein the misters are position generally outwardly and generally away from the opening of the air intake, thus cooling the air before the air enters the air intake of the associated air cooler, thus increasing the effectiveness and efficiency of the cooling system.

The mister manifold or manifolds may be made of any material capable of forming a tube including metallic and non-metallic materials. Preferably the mister manifold will be made of plastic tubing of any size, preferably between about $1/64$ inch in diameter to about 5 inches in diameter, more preferably between about $1/32$ inch in diameter to about 2 inches in diameter flexible plastic tubing, and most preferably about $5/16$ inch flexible plastic tubing, with a plurality of misters attached thereto.

III. Method of Lowering the Temperature of Air Partially or Wholly Surrounding the Air Cooled Condenser of an Air Cooler The present invention also includes a method of lowering the temperature of the air partially or wholly surrounding the air cooled condenser of an air cooler by way of directing a fine mist of cooling fluid through at least one mister adapted to be connected to a fluid source, wherein the nozzle of the mister is positioned generally outwardly and generally away from the air cooled condenser. This mist cloud partially or wholly surrounds the air cooled condenser, lowering the temperature of the air accessible to the air cooled condenser. This system increases the efficiency of the cooling system because the cool air partially or wholly surrounding the air cooled condenser lowers the temperature of the air cooled condenser faster and by a larger degree than the surrounding air that is not cooled by the mist cooler of the present invention. By lowering the temperature of the air partially or wholly surrounding the air cooled condenser the present invention will reduce energy consumption.

EXAMPLES

Example I

Lowering the Temperature of Air Partially or Wholly Surrounding the Air Cooled Condenser of an Air Cooler This Example provides a device for lowering the air temperature of air partially or wholly surrounding the air cooled condenser having a typical cubical configuration. The mister manifold is made of industrial plastic tubing and configured to encircle the air cooled condenser. Pieces of the plastic tubing can be cut to match the sides of the air cooled condenser and joined to together by the proper size and shape tube connectors. A plurality of misters, having an output capacity of $3/4$ gallons per hour, are attached to the front side of the mister manifold, spaced about 20 inches apart. The misters are angled generally outwardly and generally away from the mister manifold and air cooled condenser. The mister manifold with misters is mounted on the air cooled condenser using cable ties, such that the mister nozzles are angled generally outwardly and generally away from the air cooled condenser. The mister manifold is adapted for attachment to a conventional garden hose. When fluid is released into the garden hose, the fluid enters and travels inside the mister manifold and exits through the misters. The misters create a cool mist that partially or wholly surrounds the air cooled condenser, and in operation the mist will lower the temperature of the air in close proximity to the air cooled condenser. In a typical warm day when the temperature of the air is between about 60° F. to 120° F., the present invention will lower the temperature of the air partially or wholly surrounding the air cooled condenser by about 25° F. regardless of the level of humidity.

Example II

Lowering the Temperature of Air Partially or Wholly Surrounding the Air Intake of an Associated Air Cooler This Example provides a pre-cooler for lowering the air temperature of air in close proximity to the air intake of an associated air cooler having a typical square configuration. The mister manifold is made of industrial plastic tubing and configured to traverse the air intake of the associated air cooler. Pieces of the plastic tubing can be cut to match the sides of the air intake and joined to together by the proper size and shape tube connectors. The pre-cooler may optionally include a pre-cooler housing, wherein the mister manifold traverses the sides of the housing and the housing is fastened to the air intake of the associated air cooler. A plurality of misters, having an output capacity of ¾ gallons per hour, are attached to the front side of the mister manifold, spaced about 20 inches apart. The misters are angled generally outwardly and generally away from the mister manifold and opening of the air intake of the associated air cooler. The mister manifold with misters is mounted on the air intake or the pre-cooler housing using cable ties, such that the mister nozzles are angled generally outwardly and generally away from the opening of the air intake of the associated air cooler. The mister manifold is adapted for attachment to a conventional garden hose. When fluid is released into the garden hose, the fluid enters and travels inside the mister manifold and exits through the misters. The misters create a cool mist in close proximity to the air intake of the associated air cooler, and in operation the mist will lower the temperature of the air before it enters the associated air cooler. In a typical warm day when the temperature of the surrounding air is between about 60° F. to 120° F., the present invention will lower the temperature of the air by about 25° F. regardless of the level of humidity.

Example III

Figure 1B:
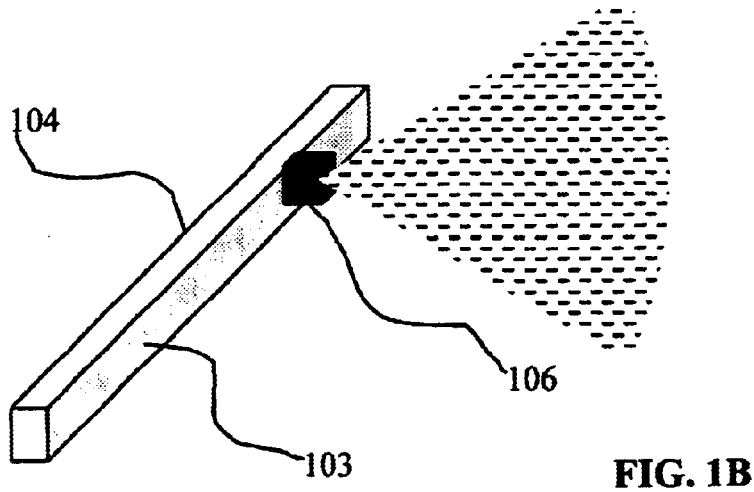
FIG. 1B shows a perspective view of mister manifold and mister in detail.

A Detailed Embodiment of A Mist Cooler Mounted on A Conventional Air Cooled Condenser of an Air Cooler Referring to FIG. 1 shows a conventional air cooled condenser 101 such as a commercially available air cooled condenser from Lennox® or Trane® with the mist cooler mounted thereon. The mist cooler comprises a mister manifold 102 preferably made of flexible plastic tubing having a front side 103 and a rear side 104. The mister manifold 102 has a connector 105 that is adapted to be connected to a fluid source such as a garden hose in such a way that fluid can be forced through the mister manifold 102. The mister manifold 102 has at least one mister 106 attached thereto, and when the fluid is forced through the mister manifold 102 the fluid exits the system at high speed through the misters 106 creating a fine mist in close proximity to the air cooled condenser 101. The output capacity of the misters 106 can vary depending on the size, location, and surrounding environment of the air cooled condenser 101. Preferably, the misters 106 have an output capacity of about ¾ gallons per hour, more preferably of about ¾ gallons per hour. The mister manifold 102 is preferably mounted on the air cooled condenser 101 by a plurality of fasteners 107 spaced apart form each other keeping the mister manifold 102 firmly in place.

The mist cooler may be regulated by a fluid valve 108 for controlling the flow of fluid through the mister manifold 102. The fluid valve 108 may be activated and deactivated manually or by a sensor 109. The sensor 109 may be, for example, a sensor for sensing the activation or the temperature of the air cooled condenser 101 programmed to activate or deactivate the fluid valve at predetermined temperatures.

Example IV

A Detailed Embodiment of A Pre-Cooler Mounted on A Conventional Air Cooler

Figures 2A, 2B:
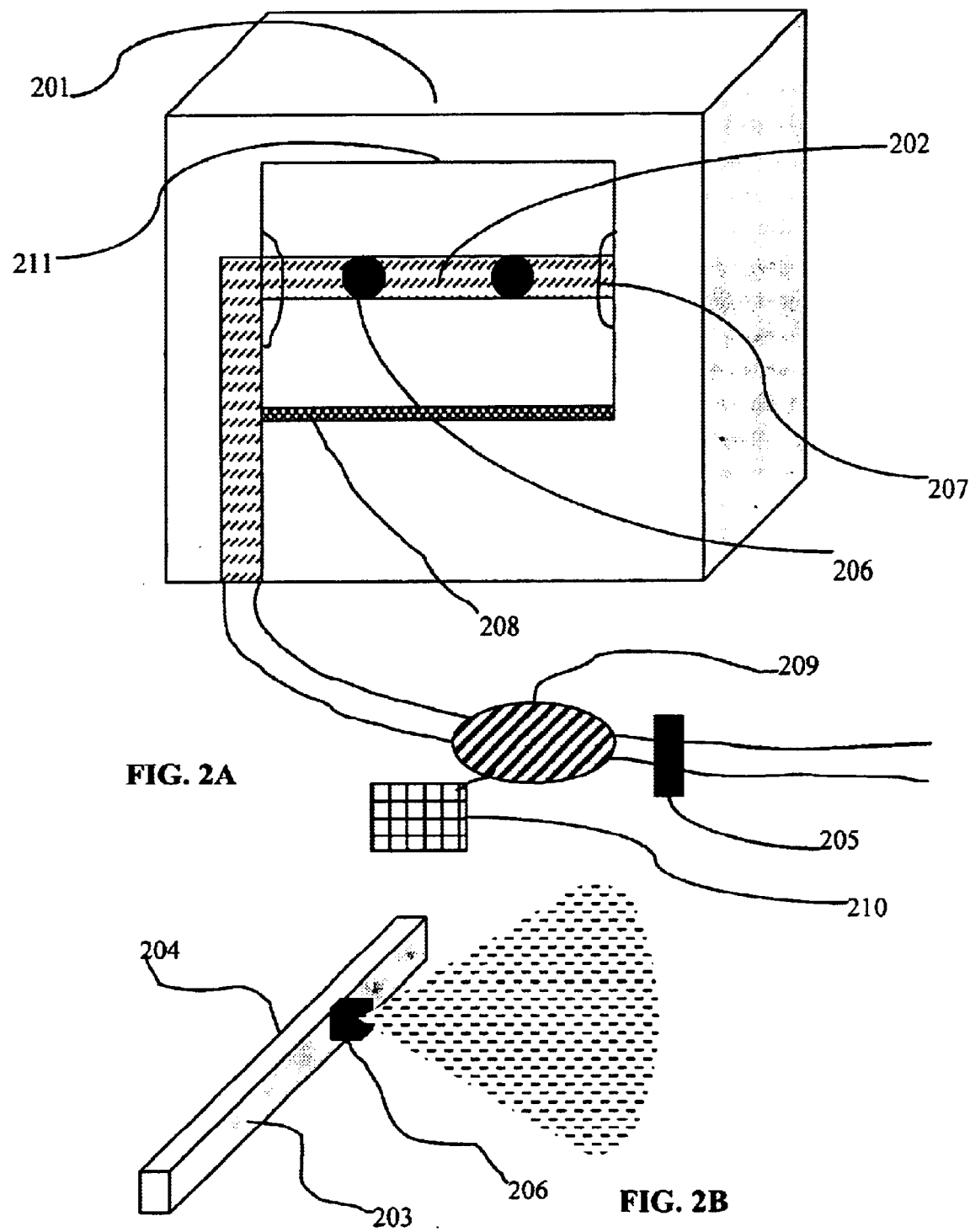
FIG. 2 show a perspective view of a conventional air cooler such as a commercially available air conditioning unit having a pre-cooler mounted thereon.

Referring to FIG. 2 shows a conventional air cooler 201 with the pre-cooler mounted in close proximity to the air intake of the air cooler. The pre-cooler comprises a mister manifold 202 preferably made of flexible plastic tubing having a front side 203 and a rear side 204. The mister manifold 202 has a connector 205 that is adapted to be connected to a fluid source such as a garden hose in such a way that fluid can be forced through the mister manifold 202. The mister manifold 202 has at least one mister 206 attached thereto, and when the fluid is forced through the mister manifold 202 the fluid exits the system at high speed through the misters 206 creating a fine mist in close proximity to the air intake of the air cooler 201. The output capacity of the misters 206 can vary depending on the size, location, and surrounding environment of the air intake of the air cooler 201. Preferably, the misters 206 have an output capacity of about ¾ gallons per hour. The mister manifold 202 is preferably mounted on the air intake of the air cooler 201 by a plurality of fasteners 207 spaced apart form each other keeping the mister manifold 202 firmly in place.

The pre-cooler can optionally include a gutter 208 configured to remove the any runoff fluid away from the air intake of the air cooler 201 and mister manifold 202 assembly. The pre-cooler may be regulated by a fluid valve 209 for controlling the flow of fluid through the mister manifold 202. The fluid valve 209 may be activated and deactivated manually or by a sensor 210. The sensor 210 may be, for example, a sensor for sensing the activation and deactivation of the air cooler 201 or the air temperature surrounding the air cooler 201. The pre-cooler may optionally include a housing 211.

All headings are for the convenience of the reader and should not be used to limit the meaning of the text that follows the heading, unless so specified. Various changes and departures may be made to the present invention without departing from the spirit and scope thereof. Accordingly, it is not intended that the invention be limited to that specifically described in the specification or as illustrated in the drawings, but only as set forth in the claims.

What is claimed is:

1. A device for lowering the temperature of air partially or wholly surrounding the condenser of an air cooler comprising:
   a mister manifold adapted to be mounted in close proximity to said condenser wherein said mister manifold is adapted to be connected to a fluid source;
   at least one mister attached to said mister manifold and angled generally outwardly and generally away from said condenser, wherein said at least one mister is configured to cover an area of between about 1 square foot to about 50 square feet;
   whereby said fluid enters said mister that in operation creates a mist in close proximity to said condenser and cooling the air partially or wholly surrounding condenser.

2. The device of claim 1, further comprising a fluid valve for controlling the flow of said fluid through said mister manifold.

3. The device of claim 2, further comprising a sensor for sensing the activation of said condenser, wherein said device is activated and deactivated in synch with said condenser.

4. The device of claim 1, wherein said misters have an output capacity of between about 0.1 gallons per hour to about 10 gallons per hour.

5. The device of claim 1, wherein the mist of said plurality of misters is configured to cover an area of between about 5 square feet to about 20 square feet.

6. The device of claim 1, wherein said at least one mister comprises two or more spaced apart misters.

7. The device of claim 6, wherein said two or more misters are spaced between about 0.5 inches to about 48 inches apart.

8. The cooling device of claim 1, wherein said mister manifold comprises plastic tubing.

9. A pre-cooler for air flowing through an associated air cooler comprising:
   a mister manifold having a front side and a rear side and adapted to be connected: to a fluid source, wherein said mister is mounted in close proximity to the air intake of said associated air cooler;
   two or more spaced apart misters located on said front side of said mister manifold wherein said misters are angled generally outwardly and generally away from said front side of said mister manifold, wherein said misters are configured to cover an area of between about 1 square foot to about 50 square feet;
   whereby said fluid enters said mister that in operation creates a mist in close proximity to said air intake of said associated air cooler, cooling the air in close proximity to said air intake.

10. The pre-cooler of claim 9, further comprising a housing.

11. The pre-cooler of claim 9, further comprising a gutter for collection of runoff liquid.

12. The pre-cooler of claim 9, further comprising a fluid valve for controlling the flow of said fluid through said mister manifold.

13. The pre-cooler of claim 12, further comprising a sensor for sensing the activation or the deactivation of said associated air cooler, wherein said pre-cooler is activated and deactivated in synch with said associated air cooler.

14. The pre-cooler of claim 9, wherein said misters have an output capacity of between about 0.1 gallons per hour to about 10 gallons per hour.

15. The pre-cooler of claim 9, wherein the mist of said plurality of misters is configured to cover an area of between about 5 square feet to about 20 square feet.

16. The pre-cooler of claim 2, wherein said mister manifold comprises plastic tubing.

17. A device for lowering the temperature of air partially or wholly surrounding the condenser of an air cooler comprising:
   means for receiving a flow of fluid and introducing said fluid to at least one mister, said receiving means being mounted in close proximity to said condenser, wherein the nozzles of said mister are positioned generally outwardly and generally away from said receiving means and said condenser, wherein said at least one mister is configured to cover an area of between about 1 square foot to about 50 square feet;
   whereby said mister creates a mist of cool air partially or wholly surrounding said receiving means and said condenser.

18. The device of claim 17, further comprising means for controlling the flow of said fluid through said means for receiving a flow of fluid.

19. The device of claim 18, further comprising means for sensing the activation of said condenser, wherein said device is activated and deactivated in synch with said condenser.

20. The device of claim 17, wherein said mister has an output capacity of between about 0.1 gallons per hour to about 10 gallons per hour.

21. The device of claim 17, wherein the mist of said at least one mister is configured to cover an area of between about 5 square feet to about 20 square feet.

22. The device of claim 17, wherein said at least one mister comprises two or more spaced apart misters.

23. The device of claim 22, wherein said two or more misters are spaced between about 0.5 inches to about 48 inches apart.

24. The device of claim 17, wherein said means for receiving a flow of fluid comprises plastic tubing means.

25. A method of lowering the temperature of the air partially or wholly surrounding the condenser of an air cooler comprising the steps of:
   providing at least one mister in close proximity to said condenser with the nozzle of said mister positioned generally outwardly and generally away from said condenser, wherein said mister is adapted to be connected to a fluid source and said mister is configured to cover an area of between about 1 square foot to about 50 square feet;
   whereby said misters create a mist of cool air partially or wholly surrounding said condenser.

26. The method of claim 25, further comprising the step of providing a fluid valve for controlling the flow of said fluid through said mister manifold.

27. The method of claim 26, further comprising the step of providing a sensor for sensing the activation of said condenser, wherein said at least one mister is activated and deactivated in synch with said condenser.

28. The Method of claim 25, wherein said at least one mister has an output capacity of between about 0.1 gallons per hour to about 10 gallons per hour.

29. The Method of claim 25, wherein the mist of said at least one mister is configured to cover an area of between about 5 square feet to about 20 square feet.

30. The method of claim 25, wherein said at least one mister comprises two or more spaced apart misters.

31. The device of claim 30, wherein said two or more misters are spaced between about 0.5 inches to about 48 inches apart.

32. The cooling device of claim 25, further comprising a mister manifold, wherein said mister manifold comprises plastic tubing and is adapted to accept one or more misters.

* * * * *